US009940948B2

(12) United States Patent
Markov et al.

(10) Patent No.: US 9,940,948 B2
(45) Date of Patent: Apr. 10, 2018

(54) SYSTEMS AND METHODS FOR ENABLING INFORMATION EXCHANGES BETWEEN DEVICES

(71) Applicant: Resonance Software LLC, Wilmington, DE (US)

(72) Inventors: Denis Markov, Krasnodar (RU); Michael Karlov, London (GB); Andrey Tsaplin, Krasnodar (RU)

(73) Assignee: Resonance Software LLC, Wilmington, DE (US)

( * ) Notice: Subject to any disclaimer, the term of this patent is extended or adjusted under 35 U.S.C. 154(b) by 137 days.

(21) Appl. No.: 14/816,052

(22) Filed: Aug. 2, 2015

(65) Prior Publication Data

US 2017/0032031 A1    Feb. 2, 2017

(51) Int. Cl.
*G10L 25/00* (2013.01)
*G06F 17/30* (2006.01)
*G06F 3/16* (2006.01)

(52) U.S. Cl.
CPC .............. *G10L 25/00* (2013.01); *G06F 3/165* (2013.01); *G06F 17/30752* (2013.01); *G06F 17/30769* (2013.01)

(58) Field of Classification Search
None
See application file for complete search history.

(56) References Cited

U.S. PATENT DOCUMENTS

| | | | | |
|---|---|---|---|---|
| 2010/0227549 A1* | 9/2010 | Kozlay | ................ | H04L 9/0662 455/26.1 |
| 2010/0281261 A1* | 11/2010 | Razzell | ............... | H04L 63/0492 713/171 |
| 2011/0320202 A1* | 12/2011 | Kaufman | ................ | G10L 17/04 704/251 |
| 2012/0084131 A1* | 4/2012 | Bergel | .............. | G06F 17/30876 705/14.26 |
| 2013/0226586 A1* | 8/2013 | Jang | ........................ | H04K 1/02 704/273 |
| 2014/0046464 A1* | 2/2014 | Reimann | ................ | H04R 27/00 700/94 |
| 2014/0098644 A1* | 4/2014 | Boudville | ......... | G06F 17/30047 367/197 |
| 2014/0219461 A1* | 8/2014 | Liu | ........................ | G10L 19/02 381/56 |
| 2014/0226834 A1* | 8/2014 | Kallai | .................... | H04R 27/00 381/80 |
| 2015/0208171 A1* | 7/2015 | Funakoshi | ................ | H04S 7/30 381/26 |

(Continued)

*Primary Examiner* — Douglas Godbold
(74) *Attorney, Agent, or Firm* — Mintz Levin Cohn Ferris Glovsky and Popeo, P.C.

(57) ABSTRACT

Described is a computer-implemented method performed in connection with a computerized system incorporating an audio capture device, a central processing unit, a display device and a memory, the computer-implemented method involving: capturing an audio signal using the audio capture device; using the central processing unit to analyze the captured audio signal; when the audio signal satisfies a predetermine criterion, using the central processing unit to generate a hash of the captured audio signal; finding a similar audio signal hash among a plurality of stored audio signal hashes; and identifying a device associated with the captured audio signal using the found similar audio signal hash.

21 Claims, 5 Drawing Sheets

(56) References Cited

U.S. PATENT DOCUMENTS

| | | | | |
|---|---|---|---|---|
| 2015/0279381 A1* | 10/2015 | Goesnar | ............ | G06Q 30/0241 |
| | | | | 704/500 |
| 2015/0318874 A1* | 11/2015 | Donaldson | ............ | H04B 11/00 |
| | | | | 367/135 |
| 2015/0334504 A1* | 11/2015 | Donaldson | ............ | H04S 7/303 |
| | | | | 381/307 |
| 2016/0260437 A1* | 9/2016 | Motta | ................ | H04N 21/8358 |

* cited by examiner

SYSTEMS AND METHODS FOR ENABLING INFORMATION EXCHANGES BETWEEN DEVICES

BACKGROUND OF THE INVENTION

Technical Field

The disclosed embodiments relate in general to mobile communications, and, more specifically, to systems and methods for implementing information exchanges between two or more mobile computing devices and/or other computing systems.

Description of the Related Art

In the modern interconnected world, mobile applications have enjoyed an explosive growth and communications between mobile devices of users gained ever increasing significance. For various mobile applications, it is imperative to maximize the speed and efficiency of information exchanges between mobile devices, terminals and other gadgets as the world becomes more and more interconnected. The exchanged information may vary, ranging from contact information of users, their photos, videos, files, to financial transactions and other commercial data. On the other hand, many obstacles and unresolved issues still persist with such information exchanges, especially when the communicating mobile devices use different operating platforms or operating systems.

As would be appreciated by persons of ordinary skill in the art, in view of the above and other deficiencies of the conventional technology, new and improved systems and methods for implementing information exchanges between two or more mobile computing devices and/or other computing systems would be highly desirable.

SUMMARY OF THE INVENTION

The embodiments described herein are directed to methods and systems that substantially obviate one or more of the above and other problems associated with conventional techniques for information exchanges between mobile devices.

In accordance with one aspect of the inventive concepts described herein, there is provided a computer-implemented method performed in connection with a computerized system incorporating an audio capture device, a central processing unit, a display device and a memory, the computer-implemented method involving: capturing an audio signal using the audio capture device; using the central processing unit to analyze the captured audio signal; when the audio signal satisfies a predetermine criterion, using the central processing unit to generate a hash of the captured audio signal; finding a similar audio signal hash among a plurality of stored audio signal hashes; and identifying a device associated with the captured audio signal using the found similar audio signal hash.

In one or more embodiments, the predetermined criterion is a presence of the audio signal.

In one or more embodiments, the predetermined criterion is a volume of the captured audio signal exceeding a predetermined threshold.

In one or more embodiments, method further comprises, when the audio signal does not satisfy the predetermine criterion, generating a random sound using a sound generation device.

In one or more embodiments, the method further comprises transmitting the captured audio signal to a remote server, wherein the hash is generated on the remote server.

In one or more embodiments, the remote server is a cloud server.

In one or more embodiments, the finding of the similar audio signal is performed on a remote server.

In one or more embodiments, the remote server comprises a database and wherein the plurality of audio signal hashes are stored in the database.

In one or more embodiments, the method further comprises performing a data transfer with the identified device based on the identity of the identified device.

In accordance with another aspect of the inventive concepts described herein, there is provided a computerized system incorporating an audio capture device, a central processing unit, a display device and a memory, the memory storing a set of computer-executable instructions for: capturing an audio signal using the audio capture device; using the central processing unit to analyze the captured audio signal; when the audio signal satisfies a predetermine criterion, using the central processing unit to generate a hash of the captured audio signal; finding a similar audio signal hash among a plurality of stored audio signal hashes; and identifying a device associated with the captured audio signal using the found similar audio signal hash.

In one or more embodiments, the predetermined criterion is a presence of the audio signal.

In one or more embodiments, the predetermined criterion is a volume of the captured audio signal exceeding a predetermined threshold.

In one or more embodiments, the memory further stores instructions for, when the audio signal does not satisfy the predetermine criterion, generating a random sound using a sound generation device.

In one or more embodiments, the memory further stores instructions for transmitting the captured audio signal to a remote server, wherein the hash is generated on the remote server.

In one or more embodiments, the remote server is a cloud server.

In one or more embodiments, the finding of the similar audio signal is performed on a remote server.

In one or more embodiments, the remote server comprises a database and wherein the plurality of audio signal hashes are stored in the database.

In one or more embodiments, the memory further stores instructions for performing a data transfer with the identified device based on the identity of the identified device.

In accordance with yet another aspect of the inventive concepts described herein, there is provided a non-transitory computer-readable medium embodying a set of computer-executable instructions, which, when executed in a computerized system incorporating a computerized system comprising an audio capture device, a central processing unit, a display device and a memory, cause the computerized system to perform a method involving: capturing an audio signal using the audio capture device; using the central processing unit to analyze the captured audio signal; when the audio signal satisfies a predetermine criterion, using the central processing unit to generate a hash of the captured audio signal; finding a similar audio signal hash among a plurality of stored audio signal hashes; and identifying a device associated with the captured audio signal using the found similar audio signal hash.

In one or more embodiments, the predetermined criterion is a presence of the audio signal.

In one or more embodiments, the predetermined criterion is a volume of the captured audio signal exceeding a predetermined threshold.

In one or more embodiments, method further comprises, when the audio signal does not satisfy the predetermine criterion, generating a random sound using a sound generation device.

In one or more embodiments, the method further comprises transmitting the captured audio signal to a remote server, wherein the hash is generated on the remote server.

In one or more embodiments, the remote server is a cloud server.

In one or more embodiments, the finding of the similar audio signal is performed on a remote server.

In one or more embodiments, the remote server comprises a database and wherein the plurality of audio signal hashes are stored in the database.

In one or more embodiments, the method further comprises performing a data transfer with the identified device based on the identity of the identified device.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

To address the above and other problems associated with the conventional technology, one or more embodiments described herein implement various exemplary systems and methods for implementing information exchanges between two or more mobile computing devices and/or other computing systems. One aspect of the inventive concepts described herein provides an information exchange methodology that allows two or more computing devices, such as smartphones or PDAs to pinpoint each others' location using their built-in microphone and their central processing unit to capture and analyze small samples of the surrounding audio environment. In one or more embodiments, based on the captured sound sample, an "audio fingerprint" is created. This created "fingerprint" is sent back to a cloud database where it is compared and matched with other "fingerprints" stored therein. If a match is found, the devices are then enabled to immediately exchange any necessary information. In various embodiments, the aforesaid "fingerprint" may be generated on the mobile device itself or on the remote (e.g. cloud) server.

Figure 1:
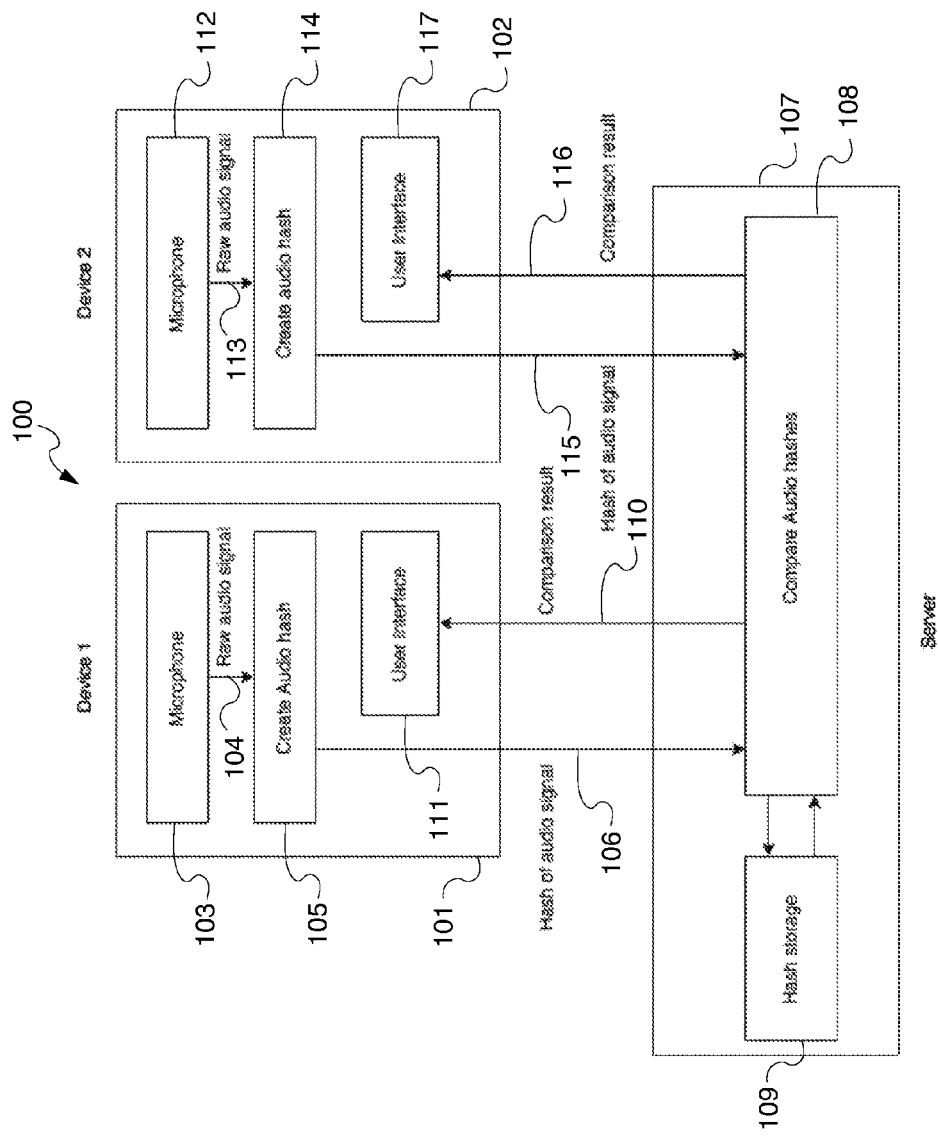
FIG. 1 illustrates an exemplary embodiment of a computerized system for exchanging information between mobile computing devices.

FIG. 1 illustrates an exemplary embodiment of a computerized system 100 for exchanging information between mobile computing devices 101 and 102, which are spatially positioned in proximity of one another. As shown in FIG. 1, the mobile device 101 incorporates a microphone 103, which captures an audio sample of ambient sound, which includes a sound emitted by the mobile computing device 102. The captured raw audio signal 104 is subsequently sent to processor 105 of the mobile computing device 101, which creates a hashed version thereof using any now known or later developed hashing algorithm. The hash or "fingerprint" of the captured audio signal 106 is then sent to the server 107, wherein it is compared by the server processor (see element 108 in FIG. 1) with the plurality of stored hashes 109. In various embodiments, the server 107 may be deployed in a cloud. The hash or "fingerprint" comparison result 110 is returned to the mobile computing device 101 and the identification result is displayed to the user using the user interface 111, which is generated on the corresponding display device. In various embodiments, the hash or "fingerprint" comparison result 110 indicates to the user the identity of the mobile device 102. Thus, the mobile device 101 is able to positively identify the mobile device 102 as being located nearby. This identification may be used to authorize and/or initiate data transfer between mobile computing devices 101 and 102.

The mobile computing device 102 operates in a substantially similar fashion. A microphone 112 captures ambient audio signal and converts it into an electronic form. Raw audio signal 113 is sent to the processor 114, which creates an audio signal hash or "fingerprint" 115, which is subsequently sent to the processor 108 of the server 107. The processor compares the received audio signal hash or "fingerprint" 115 with the audio hashes stored in the hash or "fingerprint" storage 109 and returns comparison result 116 to the mobile device 102. The comparison result is displayed to the user in the user interface 117.

In one or more embodiments, to sample and match audio "fingerprints" numerous now known, commercially available or later developed algorithms of perceptual hashing may be used, including, without limitation, FDMF; MusicURI; jHears is; Schmidt (formerly of Tuneprint); AudioScout; OpenFP; Echoprint; libFooID; Freetantrum; advert; Last.fm; AudioID; Shazam; RoviMediaRecognitionService (formerly AMGLASSO); Gracenote MusicID; Philips; USC and The Song Tapper.

It should be noted that in the exemplary embodiment of the system shown in FIG. 1, there is no need for the user to enter any identifiers (e.g. phone number, nickname, etc.) into the mobile device in order to identify it to the other mobile device. The respective mobile devices need only to be identified as being next to each other based on their audio environment after which information can be safely sent between the mobile devices through the cloud. In various embodiments, any device with a built-in microphone may be used in connection with the system 100, including, without limitation, mobile and smart phones, bank terminals, self-service terminals and the like.

Figure 2:
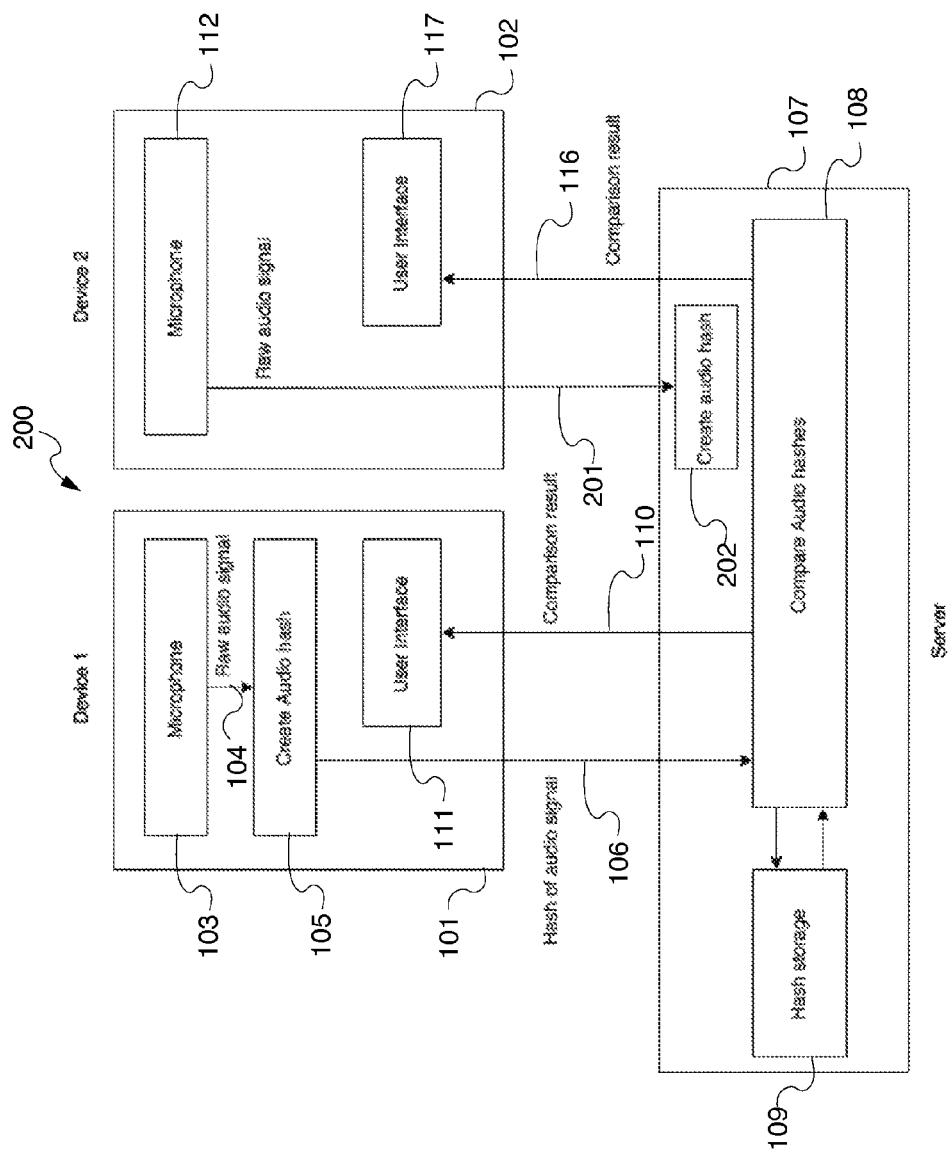
FIG. 2 illustrates another, alternative exemplary embodiment of a computerized system for exchanging information between mobile computing devices.

FIG. 2 illustrates another exemplary embodiment of a computerized system 200 for exchanging information between mobile computing devices 101 and 102, which are spatially positioned in a proximity of one another. In this embodiment, the mobile computing device 101 operates in the same way as the mobile computing device 101 shown in FIG. 1. On the other hand, in this embodiment 200, the mobile computing device 102 does not have the processing capability to create a hash or "fingerprint" of the captured audio signal, as may be the case with older mobile phones. Therefore, instead of crating the hash or "fingerprint" locally, the mobile computing device 102 sends the captured raw audio signal 201 to the server 107, which uses its more powerful processing unit to create the audio hash or "fingerprint" 202 and to perform the comparison of the created audio hash or "fingerprint" with the stored audio hash or "fingerprint" samples. The comparison results 116 are again returned to the mobile computing device 102, where they are displayed to the user using the user interface 117 and/or used to authorize or initiate data exchange between the mobile computing devices 101 and 102.

In various embodiments, the hash storage 109 may be deployed as a database. In various embodiments, this database may be implemented based on any now known or later developed type of database management system, such as a relational database management system, including, without limitation, MySQL, Oracle, SQL Server, DB2, SQL Anywhere, PostgreSQL, SQLite, Firebird, redis, MongoDB, Hadoop and/or MaxDB, which are well-known to persons of skill in the art. In an alternative embodiment, a cloud-based distributed database, such as Amazon Relational Database Service (Amazon RDS), well known to persons of ordinary skill in the art, may also be used in place of the hash storage 109.

Figure 3:
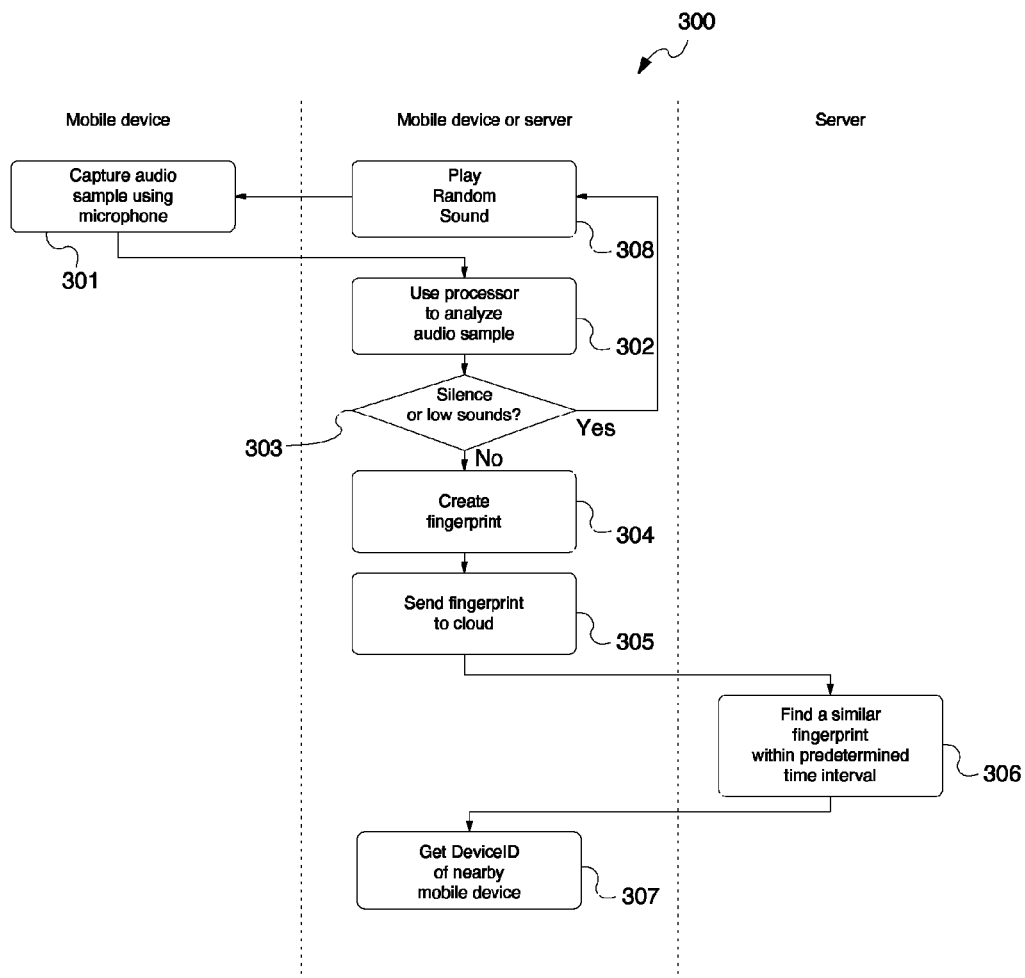
FIG. 3 illustrates an exemplary block diagram of an embodiment of a software algorithm executed in connection with the inventive computerized system for exchanging information between mobile computing devices illustrated in FIGS. 1 and 2.

FIG. 3 illustrates an exemplary block diagram of an embodiment of a software algorithm executed in connection with the inventive computerized system for exchanging information between mobile computing devices illustrated in FIGS. 1 and 2. First, at step 301, performed on the mobile computing device 101 or 102 of the user, ambient audio is captured using the microphone 103 or 112 of the respective mobile computing device 101 or 102. The captured audio signal is analyzed at step 302 and the corresponding fingerprint is created. This can be done locally on the respective mobile computing device 101 or 102 or remotely on the server 107, which has increased data processing capacity.

If a silence or low-volume sounds are detected, see step 303, performed on the mobile device or the server, the process operation continues to step 308, in which a random sound is generated and the process subsequently returns to the aforesaid step 301. Otherwise, the process proceeds to step 304, whereupon a "fingerprint" of the captured audio sample is created (on the mobile computing device or the server) using one of the aforesaid hashing algorithms. Subsequently, at step 305, the created "fingerprint" is sent to the cloud server 107. This step is performed only if the preceding steps are performed on the mobile computing device. At step 30, performed on the could server 107, the created "fingerprint" is user to search the hash storage 109 for a similar "fingerprint". If a matching fingerprint is found in the hash storage 109, the corresponding device identifier (DeviceID) is obtained from the hash storage, see step 307, which can be performed on either the server 107 or the corresponding mobile computing device.

As would be appreciated by persons of ordinary skill in the art, currently there exist several methods that allow determination that two or more devices are located in vicinity of one another. All these methods utilize location services (geolocation), WiFi, Bluetooth, NFC etc., all of which have their limitations. On the other hand, the technique described herein can work even in silence. If there is not enough sound to create a distinctive audio environment the described device can play a melody or a ringtone to create an audio disturbance and find a match. Speaking a few words by the user into the microphone with two or more devices in a proximity of one another may also be used.

In one or more embodiments, the initiation of "fingerprint" recordings as described above could vary: the described service can be initiated with the device's gyroscope (by shaking or tilting the device), by pressing a button in a specially designed application, by the corresponding application running on in the background and any other suitable method. In one or more embodiments, turning on location services as well as GeoIP and the Mac-address, greatly narrows down the search radius and speeds up the process of identifying geographic proximity of devices.

Computing Platforms

Figure 4:
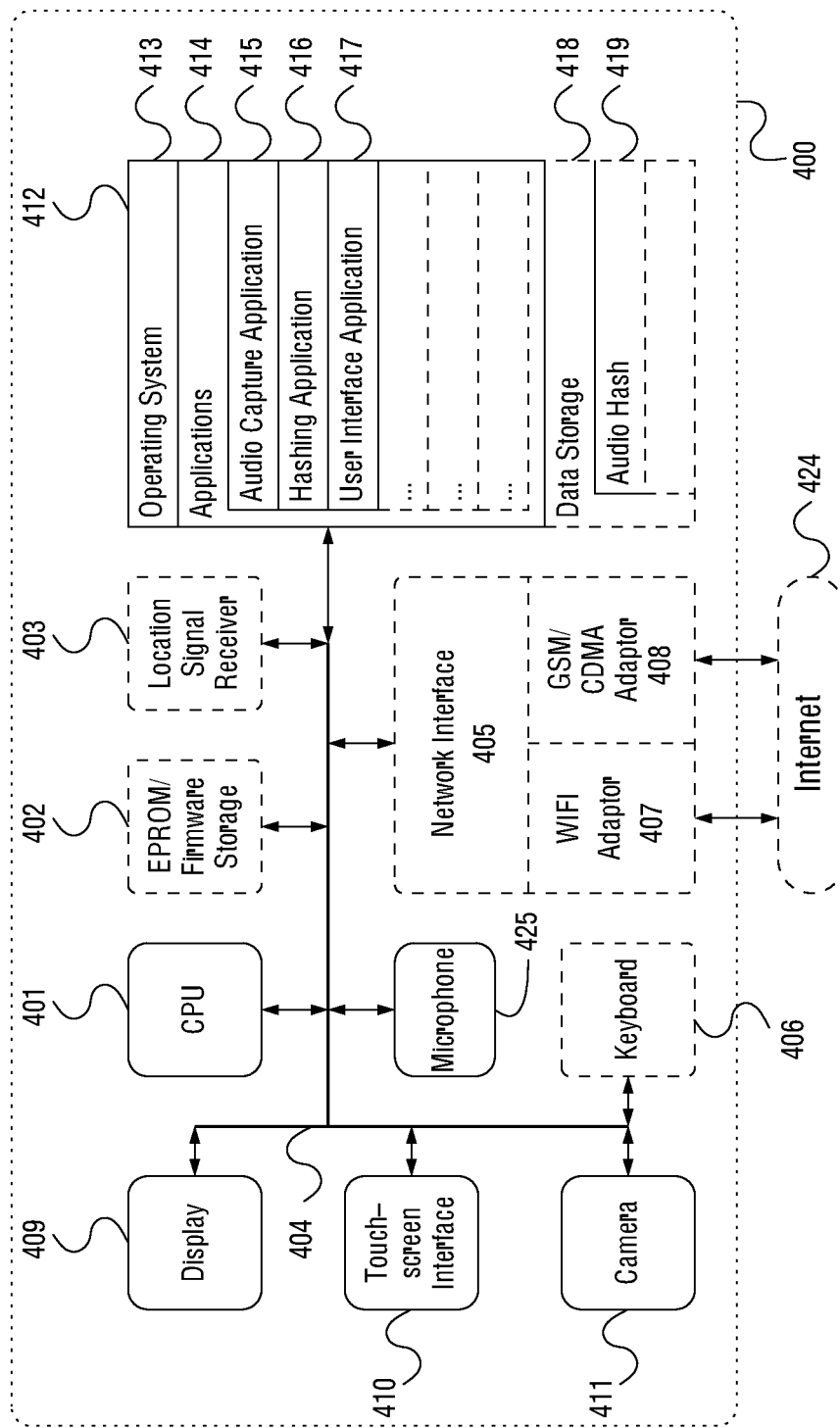
FIG. 4 illustrates an exemplary embodiment of a computerized mobile system that could be used as the user's mobile computing device in connection with the computerized system for exchanging information between mobile computing devices shown in FIGS. 1 and 2.

FIG. 4 illustrates an exemplary embodiment of a computerized mobile system that could be used as the user's mobile computing device in connection with the computerized system for exchanging information between mobile computing devices shown in FIGS. 1 and 2. In one or more embodiments, the computerized mobile system 400 may be implemented within a form factor of a mobile computing device, such as a smartphone, a personal digital assistant (PDA), a tablet computer, or a smart watch, all of which are widely available commercially and are well known to persons of skill in the art.

The computerized system 400 may include a data bus 404 or other interconnect or communication mechanism for communicating information across and among various hardware components of the mobile computerized system 400, and a central processing unit (CPU or simply processor) 401 coupled with the data bus 404 for processing information and performing other computational and control tasks. Computerized system 400 also includes a memory 412, such as a random access memory (RAM) or other dynamic storage device, coupled to the data bus 404 for storing various information as well as instructions to be executed by the processor 401. The memory 412 may also include persistent storage devices, such as a magnetic disk, optical disk, solid-state flash memory device or other non-volatile solid-state storage devices.

In one or more embodiments, the memory 412 may also be used for storing temporary variables or other intermediate information during execution of instructions by the processor 401. Optionally, computerized system 400 may further include a read only memory (ROM or EPROM) 402 or other static storage device coupled to the data bus 404 for storing static information and instructions for the processor 401, such as firmware necessary for the operation of the computerized system 400, basic input-output system (BIOS), as well as various configuration parameters of the computerized system 400.

Figure 5:
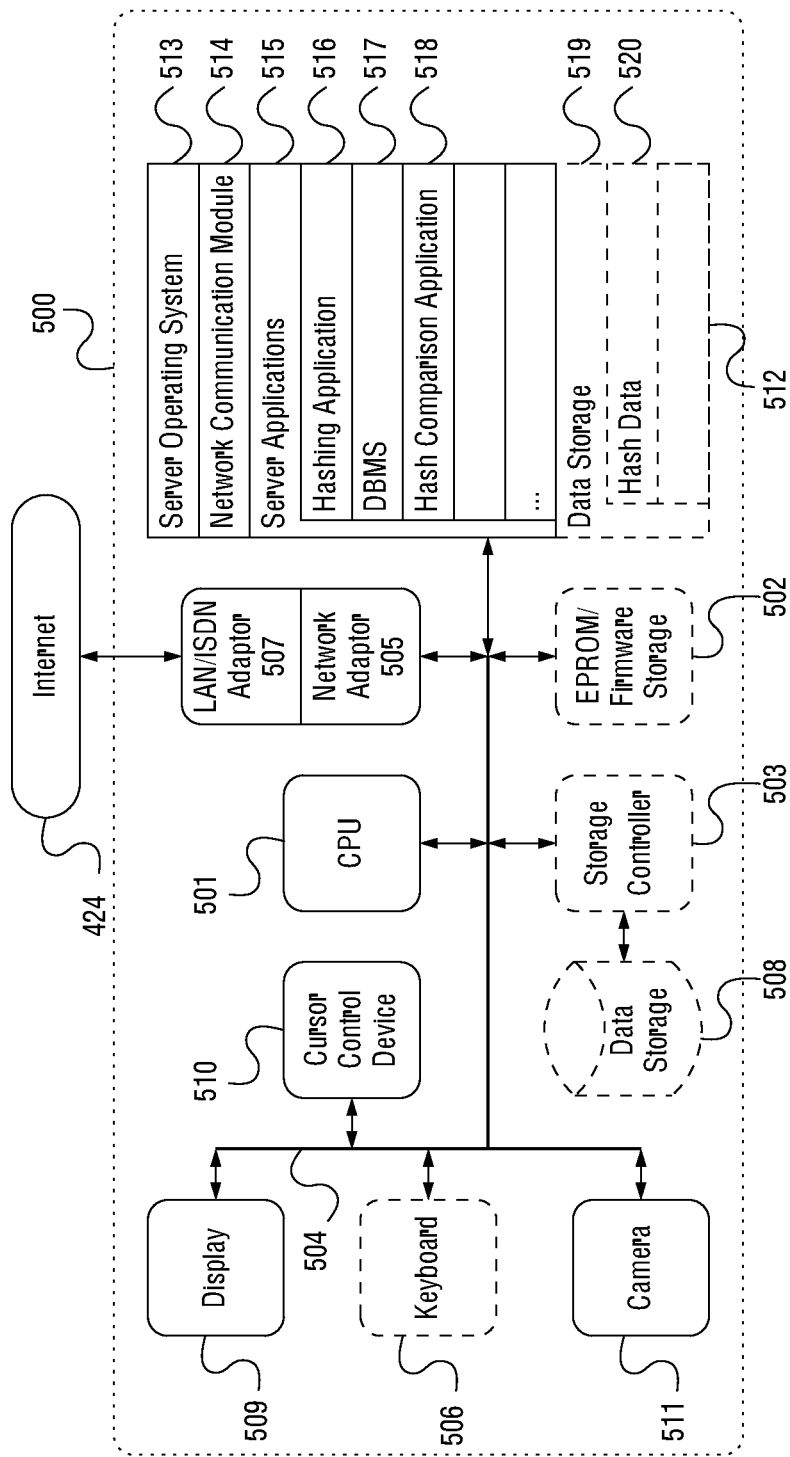
FIG. 5 illustrates an exemplary embodiment of a computerized server system, which could be used, for example, as the server of the inventive computerized system for exchanging information between mobile computing devices shown in FIGS. 1 and 2.

In one or more embodiments, the computerized system 400 may incorporate a display device 409, which may be also coupled to the data bus 404, for displaying various information to a user of the computerized system 400, such as the user interface screens shown in FIGS. 4 and 5. In an alternative embodiment, the display device 409 may be associated with a graphics controller and/or graphics processor (not shown). The display device 409 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 409 may be incorporated into the same general enclosure with the remaining components of the computerized system 400. In an alternative embodiment, the display device 409 may be positioned outside of such enclosure.

In one or more embodiments, the computerized system 400 may further incorporate a microphone 425 connected to the data bus 404 and configured to capture ambient audio sound and convert it into electronic form.

In one or more embodiments, the computerized system 400 may incorporate one or more input devices, such as a touchscreen interface 410 for receiving tactile commands, a camera 411 for acquiring still images and video of various objects, as well as a keyboard 406, which all may be coupled to the aforesaid data bus 404 for communicating information, including, without limitation, images and video, as well as user command selections to the processor 401. In an alternative embodiment, input devices may include a system for tracking eye movements of the user (not shown), which may be used to indicate to the computerized system 400 the command selection by the user.

In one or more embodiments, the computerized system 400 may additionally include a location signal receiver 403 configured to perform scan for GPS signal or beacons and supply scan data described above to the processor 401 via the data bus 404.

In one or more embodiments, the computerized system 400 may additionally include a communication interface, such as a network interface 405 coupled to the data bus 404. The network interface 405 may be configured to establish a connection between the computerized system 400 and the Internet 424 using at least one of WIFI interface 407 and the cellular network (GSM or CDMA) adaptor 408. The network interface 405 may be configured to provide a two-way data communication between the computerized system 400 and the Internet 424. The WIFI interface 407 may operate in compliance with 802.11a, 802.11b, 802.11g and/or 802.11n protocols as well as Bluetooth protocol well known to persons of ordinary skill in the art. In an exemplary implementation, the WIFI interface 407 and the cellular network (GSM or CDMA) adaptor 408 send and receive electrical or electromagnetic signals that carry digital data streams representing various types of information.

In one or more embodiments, the Internet 424 typically provides data communication through one or more sub-networks to other network resources. Thus, the computerized system 400 is capable of accessing a variety of network resources located anywhere on the Internet 424, such as web servers, other content servers as well as other network data storage resources. In one or more embodiments, the computerized system 400 is configured send and receive messages, media and other data, including application program code, through a variety of network(s) including Internet 424 by means of the network interface 405. In the Internet example, when the computerized system 400 acts as a network client, it may request code or data for an application program executing on the computerized system 400. Similarly, it may send various data or computer code to other network resources.

In one or more embodiments, the computerized system 400 uses the network interface 405 to send request(s), via the Internet 424, such as HTTP requests, to the servers 3 and receive various information, including, without limitation, the aforesaid information displayed to the user using the user interface shown in FIGS. 4 and 5.

In one or more embodiments, the functionality described herein is implemented by computerized system 400 in response to processor 401 executing one or more sequences of one or more instructions contained in the memory 412. Such instructions may be read into the memory 412 from another computer-readable medium. Execution of the sequences of instructions contained in the memory 412 causes the processor 401 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 401 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 901 for execution. For example, the instructions may initially be carried on a magnetic disk from a remote computer. Alternatively, a remote computer can load the instructions into its dynamic memory and send the instructions over the Internet 424. Specifically, the computer instructions may be downloaded into the memory 412 of the computerized system 400 from the foresaid remote computer via the Internet 424 using a variety of network data communication protocols well known in the art.

In one or more embodiments, the memory 412 of the computerized system 400 may store any of the following software programs, applications or modules:

1. Operating system (OS) 413, which may be a mobile operating system for implementing basic system services and managing various hardware components of the computerized system 400. Exemplary embodiments of the operating system 413 are well known to persons of skill in the art, and may include iOS, Android, Windows Mobile or any other now known or later developed mobile operating system(s).

2. Mobile applications 414 may include, for example, a set of software applications executed by the processor 401 of the computerized system 400, which cause the computerized mobile system 400 to perform certain predetermined functions, such as capture audio signal, create the "fingerprint" thereof and transmit it to the server 107, to receive information for displaying to the user and to display this information to the user using the graphical user interface displayed on the display device as described above. In one or more embodiments, the mobile applications 414 may include, for example, an audio capture application 415 for capturing audio signal using microphone 425, hashing application 416 for creating a fingerprint of the captured audio signal using a hashing algorithm and a user interface generation application 417 for generating a user interface on the display device 409.

3. Data storage 418 may be used, for example, for storing audio signal hash or "fingerprint" data 419 as well as other suitable statistical information.

FIG. 5 illustrates an exemplary embodiment of a computerized server system, which could be used, for example, as the server of the inventive computerized system for exchanging information between mobile computing devices shown in FIGS. 1 and 2. It should be noted that other components of the described system such as the database engine 4 may be also deployed on the computerized server system 500.

In one or more embodiments, the computerized server system 500 may incorporate a data bus 504, which may be substantially similar and may perform substantially similar functions as the data bus 504 of the computerized system 400 illustrated in FIG. 4. In various embodiments, the data bus 504 may use the same or different interconnect and/or communication protocol as the data bus 404. The one or more processors (CPUs) 501, the network adaptor 505, the EPROM/Firmware storage 502, the display device 509 and the keyboard 506 of the computerized server system 500 may be likewise substantially similar to the respective processor 401, the network interface 405, the EPROM/Firmware storage 402, the display device 409 and the keyboard 406 of the computerized system 400, except that the former components are deployed in a server platform configuration. In various implementations, the one or more processor 501 may have substantially increased processing power as compared with the processor 401.

In addition to the input device 506 (keyboard), the computerized server system 500 may additionally include a cursor control device 510, such as a mouse, a trackball, or cursor direction keys for communicating direction information and command selections to processor 501 and for controlling cursor movement on the display device 509. This input device typically has two degrees of freedom in two axes, a first axis (e.g., x) and a second axis (e.g., y), that allows the device to specify positions in a plane.

The LAN/ISDN adaptor 507 of the computerized server system 500 may be implemented, for example, using an integrated services digital network (ISDN) card or a modem to provide a data communication connection to a corresponding type of telephone line, which is interfaced with the Internet 424 using Internet service provider's hardware (not shown). As another example, the LAN/ISDN adaptor 507 may be a local area network interface card (LAN NIC) to provide a data communication connection to a compatible LAN and the Internet 424. To store various data files, the computerized server system 500 may be provided with data storage 508, for storing various statistical data to be displayed to the user by means of a storage controller 503. The camera 511 may be used to acquire images and/or video of various objects.

In one or more embodiments, the memory 512 of the computerized server system 500 may store any of the following software programs, applications, modules and/or data:

1. A server operating system (OS) 513, which may be an operating system for implementing basic system services and managing various hardware components of the computerized server system 500. Exemplary embodiments of the server operating system 513 are all well known to persons of skill in the art, and may include Windows Server, Mac OS, Unix, AIX, FreeBSD, Linux, as well as any now known or later developed operating systems.

2. A network communication module 514 may incorporate, for example, one or more network protocol stacks which are used to establish a networking connection between the computerized server system 500 and the various network entities of the Internet 424, such as the computerized mobile system 400, using the network adaptor 505 working in conjunction with the LAN/ISDN adaptor 507.

3. Server applications 515 may include, for example, a set of software applications executed by one or more processors 501 of the computerized server system 500, which cause the computerized server system 500 to perform certain predetermined functions or tasks, such as create hash or "fingerprint" of the captured audio signal and compare this hash with the contents of the hash storage. In one or more embodiments, the server applications 515 may include a hashing application 516 for generating hash of the audio signal, the functionality of which was described in detail above. Additionally provided may be a database management system 517 for storing and managing access to various information as described in detail above, such as hash storage data. A hash comparison application 518 may be provided to calculate distance (e.g. difference) between two hashes and to find matching nashies.

4. Data storage 519 may be used, for example, for storing the hash data or comparison to the generated hash, which may be stored in a form of one or more database tables containing database records.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for implementing information exchanges between two or more mobile computing devices and/or other computing systems. It is intended that the specification and examples be considered as exemplary only, with a true scope and spirit of the invention being indicated by the following claims.

What is claimed is:

1. A computer-implemented method performed in connection with a computerized system comprising an audio capture device, a central processing unit, a display device and a memory, the computer-implemented method comprising:
    capturing an audio signal using the audio capture device, the audio signal comprising a sample of ambient sound in a surrounding audio environment of the audio capture device;
    using the central processing unit to generate a hash of the captured audio signal;
    transmitting the hash of the captured audio signal to a server;
    receiving a comparison result from the server identifying a second device, the second device associated with a similar audio signal hash, the similar audio hash derived from a sample of ambient sound in a surrounding audio environment of the second device; and
    authorizing data transfer between the audio capture device and the second device associated with the similar audio signal hash based on the comparison result.

2. The computer-implemented method of claim 1, wherein the predetermined criterion is a presence of the audio signal.

3. The computer-implemented method of claim 1, wherein the predetermined criterion is a volume of the captured audio signal exceeding a predetermined threshold.

4. The computer-implemented method of claim 1, further comprising, when the audio signal does not satisfy the predetermine criterion, generating a random sound using a sound generation device.

5. The computer-implemented method of claim 1, further comprising transmitting the captured audio signal to a remote server, wherein the hash is generated on the remote server.

6. The computer-implemented method of claim 5, wherein the remote server is a cloud server.

7. The computer-implemented method of claim 1, wherein the surrounding audio environment of the second device is located in a different geographic location than the surrounding audio environment of the audio capture device.

8. The computer-implemented method of claim 1, wherein the server comprises a database and wherein a plurality of audio signal hashes is stored in the database.

9. The computer-implemented method of claim 1, further comprising performing a data transfer with the second device based on the identity of the second device.

10. The computer-implemented method of claim 1, wherein the hash of the captured audio signal and the similar audio signal hash comprise perceptual hashes.

11. A computerized system comprising an audio capture device, a central processing unit, a display device and a memory, the memory storing a set of computer-executable instructions for:
    capturing an audio signal using the audio capture device, the audio signal comprising a sample of ambient sound in a surrounding audio environment of the audio capture device;
    using the central processing unit to generate a hash of the captured audio signal;
    transmitting the hash of the captured audio signal to a server;
    receiving a comparison result from the server identifying a second device, the second device associated with a similar audio signal hash, the similar audio hash derived from a sample of ambient sound in a surrounding audio environment of the second device; and
    authorizing data transfer between the audio capture device and the second device associated with the similar audio signal hash based on the comparison result.

12. The computerized system of claim 11, wherein the predetermined criterion is a presence of the audio signal.

13. The computerized system of claim 11, wherein the predetermined criterion is a volume of the captured audio signal exceeding a predetermined threshold.

14. The computerized system of claim 11, wherein the memory further stored instructions for, when the audio signal does not satisfy the predetermine criterion, generating a random sound using a sound generation device.

15. The computerized system of claim 11, wherein the memory further stored instructions for transmitting the captured audio signal to a remote server, wherein the hash is generated on the remote server.

16. The computerized system of claim 15, wherein the remote server is a cloud server.

17. The computerized system of claim 11, wherein the surrounding audio environment of the second device is located in a different geographic location than the surrounding audio environment of the audio capture device.

18. The computerized system of claim 11, wherein the server comprises a database and wherein a plurality of audio signal hashes is stored in the database.

19. The computerized system of claim 11, wherein the memory further stored instructions for performing a data transfer with the second device based on the identity of the second device.

20. A non-transitory computer-readable medium embodying a set of computer-executable instructions, which, when executed in a computerized system comprising a computerized system comprising an audio capture device, a central processing unit, a display device and a memory, cause the computerized system to perform a method comprising:
    capturing an audio signal using the audio capture device, the audio signal comprising a sample of ambient sound in a surrounding audio environment of the audio capture device;
    using the central processing unit to generate a hash of the captured audio signal;
    transmitting the hash of the captured audio signal to a server;
    receiving a comparison result from the server identifying a second device, the second device associated with a similar audio signal hash, the similar audio hash derived from a sample of ambient sound in a surrounding audio environment of the second device; and authorizing data transfer between the audio capture device and the second device associated with the similar audio signal hash based on the comparison result.

21. The non-transitory computer-readable medium of claim 20, wherein the predetermined criterion is a presence of the audio signal.

\* \* \* \* \*